(12) United States Patent
Yamaguchi et al.

(10) Patent No.: US 8,613,100 B2
(45) Date of Patent: Dec. 17, 2013

(54) DATA EXCHANGE PROCESSING APPARATUS AND DATA EXCHANGE PROCESSING METHOD

(75) Inventors: Katsuhisa Yamaguchi, Osaka (JP); Kazuhiro Nomura, Osaka (JP)

(73) Assignee: Panasonic Corporation, Osaka (JP)

( * ) Notice: Subject to any disclaimer, the term of this patent is extended or adjusted under 35 U.S.C. 154(b) by 311 days.

(21) Appl. No.: 13/058,893

(22) PCT Filed: Jun. 23, 2010

(86) PCT No.: PCT/JP2010/004169
§ 371 (c)(1),
(2), (4) Date: Feb. 14, 2011

(87) PCT Pub. No.: WO2011/001630
PCT Pub. Date: Jan. 6, 2011

(65) Prior Publication Data
US 2011/0145597 A1  Jun. 16, 2011

(30) Foreign Application Priority Data
Jun. 30, 2009 (JP) ................ 2009-154959

(51) Int. Cl.
G06F 7/04 (2006.01)
G06F 17/30 (2006.01)
H04N 7/16 (2011.01)

(52) U.S. Cl.
USPC ................ 726/26; 726/27; 726/29

(58) Field of Classification Search
USPC ................ 726/29, 26, 27
See application file for complete search history.

(56) References Cited

U.S. PATENT DOCUMENTS

| 7,657,739 | B2 | 2/2010 | Nakano et al. |
| 2002/0184259 | A1 | 12/2002 | Akishita et al. |
| 2007/0083757 | A1 | 4/2007 | Nakano et al. |
| 2007/0274521 | A1* | 11/2007 | Asano ............... 380/202 |
| 2008/0127312 | A1 | 5/2008 | Iwamoto et al. |
| 2010/0005289 | A1* | 1/2010 | Devanand et al. ........ 713/155 |

FOREIGN PATENT DOCUMENTS

| JP | 2002-135243 | 5/2002 |
| JP | 2004-96637 | 3/2004 |
| JP | 2007-81953 | 3/2007 |
| JP | 2008-131557 | 6/2008 |
| WO | 2005/052802 | 6/2005 |

OTHER PUBLICATIONS

International Search Report issued Sep. 7, 2010 in International (PCT) Application No. PCT/JP2010/004169.

* cited by examiner

Primary Examiner — Kambiz Zand
Assistant Examiner — Benjamin Kaplan
(74) Attorney, Agent, or Firm — Wenderoth, Lind & Ponack, L.L.P.

(57) ABSTRACT

The data exchange processing apparatus pertaining to the present invention includes a cryptographic engine unit performing cryptographic processing and verification processing, a stream control unit outputting content while performing cryptographic processing of the content using the cryptographic engine unit, an unauthorized device list update unit verifying an unauthorized device list using the cryptographic engine unit, and a state management unit outputting a permission notification to the unauthorized device list update unit when detecting a low load section of the content according to metadata of the content and processing position of the stream control unit, the low load section being a section in which processing load on the cryptographic engine unit is lower than in other sections. The unauthorized device list update unit, when receiving the permission notification from the state management unit, causes the cryptographic engine unit to execute verification processing of the unauthorized device list.

6 Claims, 12 Drawing Sheets

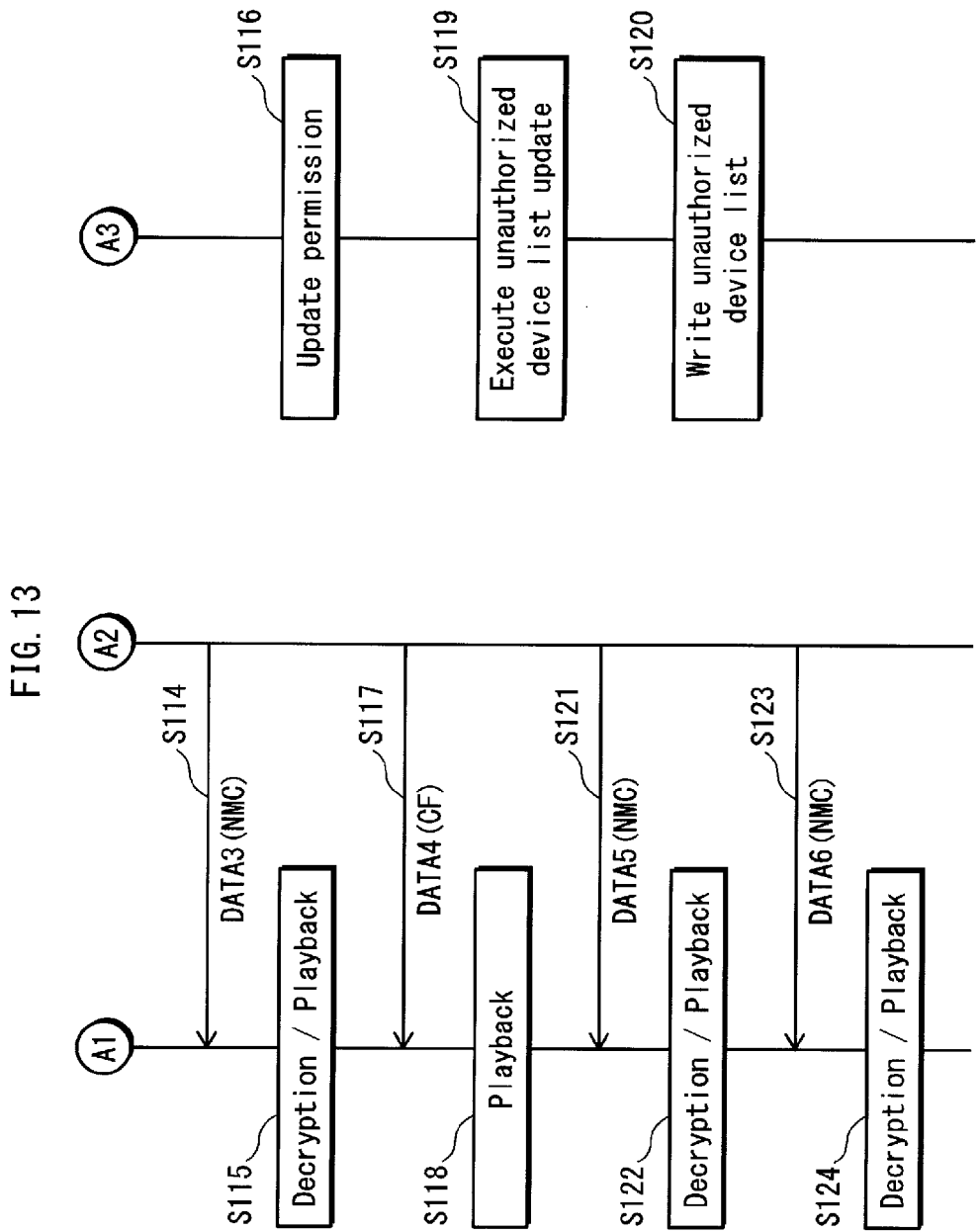

DATA EXCHANGE PROCESSING APPARATUS AND DATA EXCHANGE PROCESSING METHOD

TECHNICAL FIELD

The present invention relates to a technology for exchanging lists of unauthorized devices between digital devices having the lists.

BACKGROUND ART

In recent years, in-home networks are being realized in which domestic digital devices are connected to a network, and digital contents (referred to as "content" hereinafter) of various kinds are shared between the devices with the use of such networks.

Meanwhile, such contents as newly distributed movies and pay-per-view television programs need to be protected under copyright laws. One major means as to realize copyright protection of such contents is encryption of contents prior to transmission over the network. This technology is standardized in the DTCP-IP (Digital Transmission Content Protection over Internet Protocol) protocol.

The DTCP-IP protocol provides an authentication key exchange function compliant with AKE (Authentication and Key Exchange) and a key revocation function. Provided with such functions, DTCP guarantees safe reception of contents on authorized digital devices, while preventing fraudulent use of contents by unauthorized devices.

In addition to the above, the DTCP protocol establishes a higher extent of copyright protection by defining a technology in which transmission/reception of contents by unauthorized devices is further restrained through providing a list of unauthorized devices (specified as CRL [Certificate Revocation List] by the DTCP protocol) to each individual authorized digital device.

The unauthorized device list is distributed to each digital device by the DTLA (Digital Transmission Licensing Administrator). The unauthorized device list is subject to be updated every time a device deemed to be incompliant to the DTCP protocol is newly found and thus, a newly manufactured digital device may have a more recently updated version of the unauthorized device list compared with the unauthorized device lists held by devices manufactured earlier.

With the unauthorized device list having such characteristics, DTCP-compliant digital devices mutually exchange information on the unauthorized device lists they hold when performing transmission/reception of contents. When a list held by a local device is determined, according to the information exchanged above, to be older than a list held by a target device, the local device receives the newer list from the target device and updates the list to the newer list.

In relation to the present invention, Patent Literature 1 discloses, as a technology of exchanging the unauthorized device list, a technology of updating the unauthorized device list held by devices in a topology to the newest version on a constant basis by utilizing topology connection information.

CITATION LIST

Patent Literature

[Patent Literature 1]
Japanese Patent Application Publication No. 2004-96637

SUMMARY OF INVENTION

Technical Problem

In the case of a conventional digital device, the updating procedure of the unauthorized device list is launched whenever a new unauthorized device list is obtained, including cases where the device is currently in the midst of content stream processing.

However, a problem arises here, since stream processing and unauthorized device list update share the same single cryptographic engine unit within the device. Under such conditions, launching unauthorized device list update on a digital device while the same device is currently carrying out stream processing causes delay of playback and degradation of playback quality. In particular, the problem is that the user of the device would feel a sense of "being made to wait for playback" in such situations.

The present invention has been achieved in view of the above problems, and an aim thereof is to provide a data exchange processing apparatus and a data exchange processing method capable of performing the update of an unauthorized device list without interfering with the stream processing of contents by appropriately controlling the timing in which the unauthorized device list update is performed.

Solution to Problem

In order to solve the above-presented problems, the present invention provides a data exchange processing apparatus for exchanging a list of unauthorized devices with devices, the list of unauthorized devices used to block unauthorized devices, the data exchange processing apparatus comprising: a cryptographic engine unit operable to perform cryptographic processing and verification processing; a stream control unit operable to perform stream processing for sequentially outputting a plurality of sections constituting a content while causing the cryptographic engine unit to execute cryptographic processing on each section of the content; a list update unit operable to cause the cryptographic engine unit to execute verification processing of the list of unauthorized devices; and a state management unit operable to output, according to metadata of the content and a processing position in the content where the stream processing is being performed, a processing permission to the list update unit when detecting a low load section of the content, the low load section being a section in which processing load on the cryptographic engine unit is lower than in other sections, wherein the list update unit causes the cryptographic engine unit to launch the verification processing of the list of unauthorized devices when receiving the processing permission.

Advantageous Effects of Invention

With the above structure, the present invention makes possible interference-free stream processing and the maintaining of a high playback quality, even in cases where the unauthorized device list is updated while stream processing is in progress. This owns to the verification of the unauthorized device list being commenced seeking for and taking advantage of sections in which processing load on the cryptographic engine unit is comparatively low.

BRIEF DESCRIPTION OF DRAWINGS

FIG. 13 is a sequence diagram showing stream processing and unauthorized device list update performed by the client device 10 and the server device 20, with examples provided and continuing from FIG. 12.

DESCRIPTION OF EMBODIMENT

Figure 1:
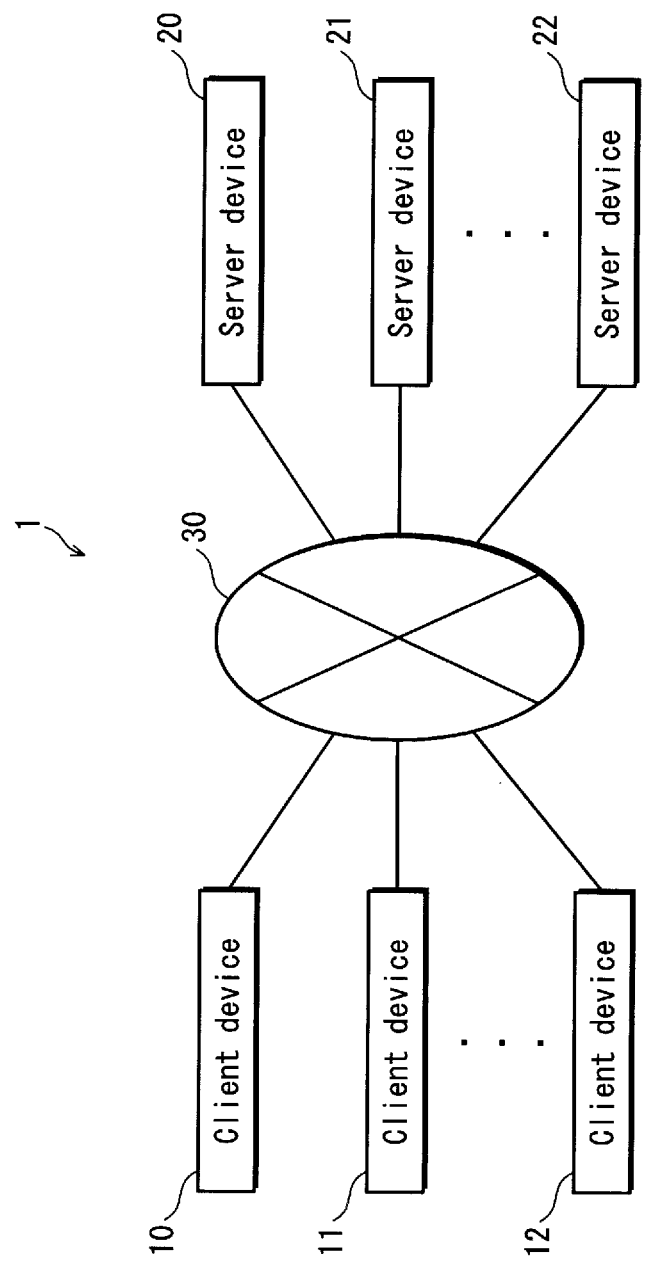
FIG. 1 is a diagram showing the structure of a network system 1.

A first aspect of the present invention is a data exchange processing apparatus for exchanging a list of unauthorized devices with devices, the list of unauthorized devices used to block unauthorized devices, the data exchange processing apparatus comprising: a cryptographic engine unit operable to perform cryptographic processing and verification processing; a stream control unit operable to perform stream processing for sequentially outputting a plurality of sections constituting a content while causing the cryptographic engine unit to execute cryptographic processing on each section of the content; a list update unit operable to cause the cryptographic engine unit to execute verification processing of the list of unauthorized devices; and a state management unit operable to output, according to metadata of the content and a processing position in the content where the stream processing is being performed, a processing permission to the list update unit when detecting a low load section of the content, the low load section being a section in which processing load on the cryptographic engine unit is lower than in other sections, wherein the list update unit causes the cryptographic engine unit to launch the verification processing of the list of unauthorized devices when receiving the processing permission.

If the data exchange processing apparatus of the present invention is included in a client device which receives an encrypted content, the cryptographic processing performed by the cryptographic engine unit is decryption of an encrypted content. On the other hand, if the data exchange processing apparatus of the present invention is included in a server device which transmits an encrypted content, the cryptographic processing performed by the cryptographic engine unit is encryption of a content.

According to a second aspect of the present invention, the data exchange processing apparatus may have a structure in which the metadata includes copy control information, the copy control information indicating whether or not each of the sections constituting the content is copyright protected, and the state management unit outputs the processing permission to the list update unit, when detecting, as the low load section, a section of the content not being copyright protected according to the copy control information and the processing position.

A section of a content requiring copyright protection needs to be encrypted by the server device and decrypted by the client device. That is, a content section with copyright protection needs to undergo cryptographic processing performed by the cryptographic engine unit. In contrast, a content section not requiring copyright protection does not need to be encrypted by the server device, and thus does not need to be decrypted by the client device. In other words, a content section not requiring copyright protection does not need to undergo the cryptographic processing performed by the cryptographic engine unit.

Therefore, by executing the verification of the unauthorized device list while the cryptographic engine unit is not being occupied by the stream control unit, the update of the unauthorized device list is carried out while maintaining a high playback quality and without interfering with the stream processing, even in cases where the update of the unauthorized device list takes place while stream processing is in progress.

Note that here, "stream processing" represents two different types of processing, according to which device it is performed by. That is, "stream processing" as performed by the server device is a process where content sections are sequentially encrypted and transmitted to the client device, whereas "stream processing" as performed by the client device is a process where content sections are sequentially received and decrypted for playback.

According to a third aspect of the present invention, the data exchange processing apparatus may have a structure in which the metadata includes section information on each of the sections constituting the content, and the state management unit outputs the processing permission to the list update unit, when detecting a final section of the content according to the section information and the processing position.

The "section information" is information including such data as: data volume and the number of frames included in each individual content section, and processing time and playback time of each individual content section. Thus, by referring to the section information and the processing position, it is possible to determine the termination point of the stream processing.

Such being the case, if a processing permission is sent to the unauthorized device list update unit at a point where the stream control unit has completed processing of the final content section, verification of the unauthorized device list is executed while the cryptographic engine unit is not being occupied by the stream control unit. Thus, updating of the unauthorized device list is carried out while maintaining high playback quality and without interfering with the stream processing.

According to a fourth aspect of the present invention, the data exchange processing apparatus may have a structure in which the state management unit outputs the processing permission to the list update unit and launches the verification processing of the list of unauthorized devices, when receiving a request for use of the cryptographic engine unit from the list update unit while the cryptographic engine unit is not executing cryptographic processing on the content, and suspends the verification processing of the list of unauthorized devices and outputs the processing permission to the stream control unit, when receiving a request for use of the cryptographic engine unit from the stream control unit.

By giving the stream control unit priority to use the cryptographic engine unit, updating of the unauthorized device list is performed while maintaining high playback quality and without interfering with the stream processing.

According to a fifth aspect of the present invention, the data exchange processing apparatus may further comprise: a holding unit operable to hold the list of unauthorized devices, wherein the list update unit includes: a judging unit judging whether or not to update the list of unauthorized devices held by the holding unit according to version information and generation information of another list of unauthorized devices obtained from another data exchange processing apparatus; an obtaining unit obtaining the other list of unauthorized devices from the other data exchange processing apparatus, when the judgment unit judges to update the list of unauthorized devices held by the holding unit; a verification unit requesting the cryptographic engine unit to execute verification processing of legitimacy of the other list of unauthorized devices, when receiving the processing permission from the state management unit; and an update unit replacing the list of unauthorized devices held by the holding list with the other list of unauthorized devices, when legitimacy of the other list of unauthorized devices is verified.

Since version information and generation information are used to determine whether an unauthorized device list is old, new, or equivalent, the implementation of an unauthorized device list with the newest Version Number and Generation is possible.

Further, the data size of the unauthorized device list can be converted according to the size of the holding unit which is composed of a non-volatile memory, by obtaining the Generation of the unauthorized device list held by the target device. This reduces the load on a network band being used as a communication channel for the exchange of the unauthorized device list, which further leads to enhanced efficiency of the exchange of the unauthorized device list. In addition, conversion of the data size of the unauthorized device list reduces CPU processing time occupied by updating of the unauthorized device list.

An embodiment of the present invention is described below with reference to the drawings.

<Overview of the System>

FIG. 1 is a diagram showing the structure of a network system 1 according to this embodiment of the present invention. As is depicted in FIG. 1, the network system 1 includes a plurality of client devices shown as client devices 10, 11, . . . ,12, and a plurality of server devices shown as server devices 20, 21, . . . ,22. Each client device and server device is provided with a communication function, and can be connected to one another via a network 30.

Each server device holds one or more contents. When a client device sends a request to a server device in order to obtain content, the server device performs stream transmission of the requested content, while the client device performs stream playback thereof.

Examples of the client device and the server device include: such AV household electric equipment as a television, a video playback device, and a recording device, such information processing devices as a personal computer and a work station, and such portable information terminals as a digital camera, a video camera, a mobile phone, and a portable image playback device.

The network 30 is a wired/wireless network, established by use of an IEEE1394, a USB or a combination thereof. Such protocols as TCP, RTP, HTTP, and FTP are applied as a communication protocol therein. In addition, each of the client devices and the server devices are provided with an IP address as address information indicative of their locations within the network. Here, note that the address information provided is not limited to an IP address, and other forms of information such as a telephone number may be used as an alternative.

Further, no limitation is imposed on the number of client devices and server devices to be included within the network system 1.

In addition, it is not necessary that the client device and the server device consistently serve as the client device and the server device. That is, according to the functions performed, the client device may serve as the server device, whereas the server device may serve as the client device.

<Overview of Streaming Playback>

Here, a brief explanation will be made on the procedures involved in a case where a client device 10 updates an unauthorized device list while performing stream playback of content held by a server device 20.

First, the client device 10 obtains management information of the content (referred to as "metadata" hereinafter) from the server device 20. The metadata includes copy control information of the content.

Then the client device 10 and the server device 20 mutually carry out an authentication key exchange. In addition, while the authentication key exchange is being carried out, the client device 10 and the server device 20 also exchange the Generations and Version Numbers of the unauthorized device lists, the local device transmitting the data to the target device.

The client device 10 and the server device 20 each carry out a comparison between the Generation and the Version Number of the unauthorized device list which the local device holds, and the Generation and the Version Number of the unauthorized device list which the target device holds. Based on the result of the comparison, the device holding the newer unauthorized device list transmits the newer unauthorized device list to the device holding the older unauthorized device list.

Here, description will be made on the presumption that the client device 10 receives a new unauthorized device list from the server device 20. In the present embodiment, the client device 10 does not launch the updating of the unauthorized device list immediately after receiving the new unauthorized device list.

The client device 10, when obtaining an exchange key, launches streaming playback by sequentially receiving, decrypting, and playing back a data stream (data packet) transmitted from the server device.

The client device 10 performs the updating of the unauthorized device list finding a point in time in which streaming playback is not interfered, referring to the metadata and the playback position.

Here, it is supposed that the copy control information provided in the metadata is set as either "No-more-copies" or "Copy-free".

A data packet having copy control information set as "No-more-copies" indicates data which requires copy protection. Therefore such data packet needs to be encrypted by the server device 20 before being transmitted thereby and also needs to be decrypted by the client device 10.

A data packet having copy control information set as "Copy-free" indicates data which does not require copy protection. Therefore such data packet does not need to be encrypted upon being transmitted and also does not need to be decrypted by the client device 10.

<Client Device 10>

Figure 2:
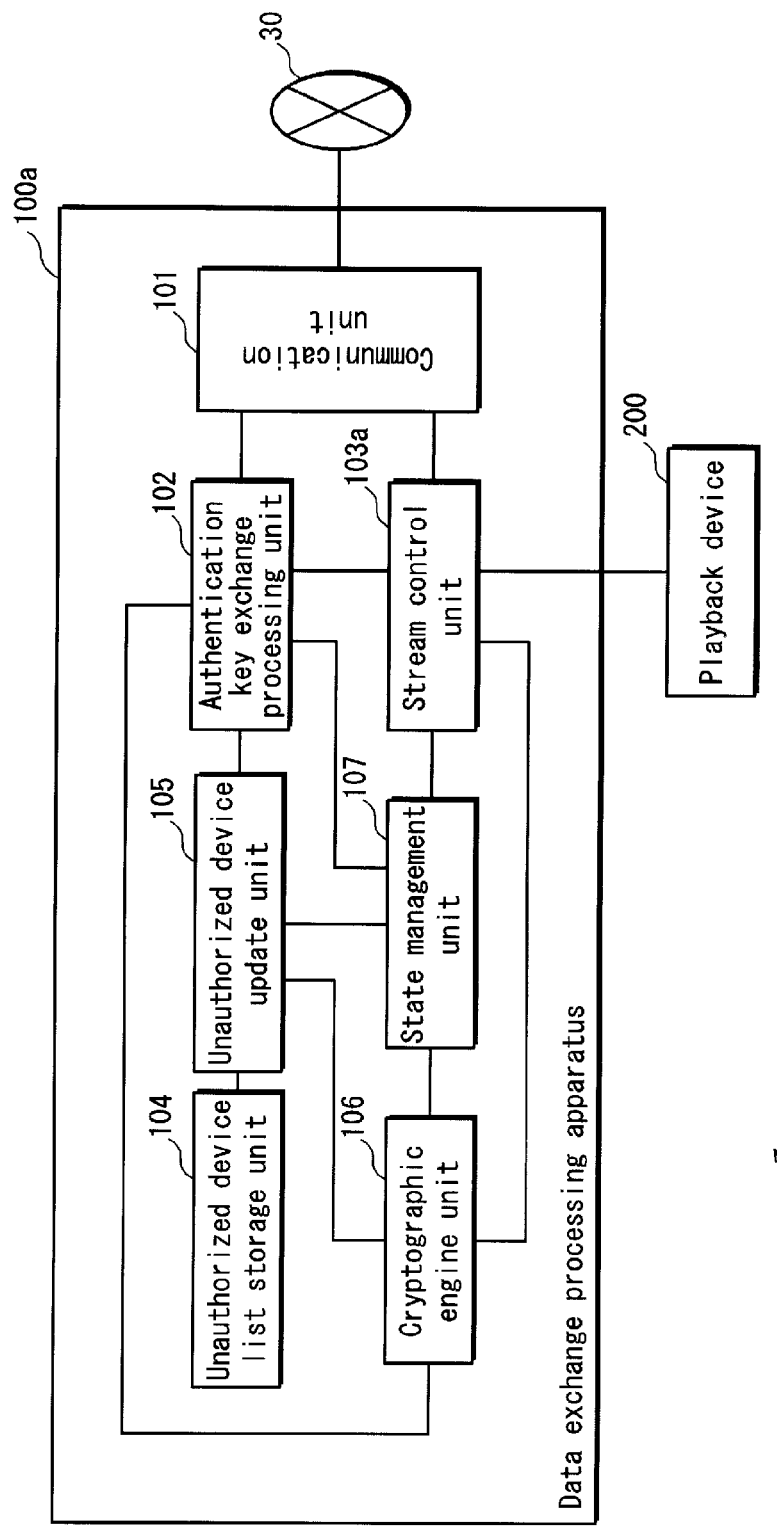
FIG. 2 is a block diagram showing the functional structure of a client device 10.

FIG. 2 is a block diagram showing the structure of the client device 10.

As depicted in FIG. 2, the client device 10 includes a data exchange processing apparatus 100a pertaining to the present invention and a playback device 200.

The data exchange processing apparatus 100a includes a communication unit 101, an authentication key exchange processing unit 102, a stream control unit 103a, an unauthorized device list storage unit 104, an unauthorized device list update unit 105, a cryptographic engine unit 106, and a state management unit 107.

The playback device 200 includes such units as a display unit, and displays thereto AV data output from the stream control unit 103a.

In the following, detailed description will be made on the data exchange processing apparatus 100a.

(1) Communication Unit 101

The communication unit 101 performs the exchange of data with the server device connected thereto via the network 30. Further, the communication unit 101 notifies the authentication key exchange processing unit 102 and the stream control unit 103a of data received from the server device. The authentication key exchange processing unit 102 and the stream control unit 103a are network applications corresponding to specified ports of the communication unit 101. In addition to this, the communication unit 101 accepts data transmission requests from the authentication key exchange processing unit 102 and the stream control unit 103a, and sends data addressed to the server device via the network 30.

(2) Authentication Key Exchange Processing Unit 102

The authentication key exchange processing unit 102 sends a request for the execution of the authentication key exchange to the communication unit 101 and sends data of the authentication key exchange to the server device via the communication unit 101, thus launching the authentication key exchange. In addition to this, the authentication key exchange processing unit 102 also receives data of the authentication key exchange from the server device via the communication unit 102.

Note that before launching the authentication key exchange, the authentication key exchange processing unit 102 sends a use request for the use of the hardware resources of the cryptographic engine unit 106 to the state management unit 107. Following this, the authentication key exchange processing unit 102 receives, from the state management unit 107, a use permission including a hardware resources identifier which identifies the hardware resources of the cryptographic engine unit 106. At this point, the authentication key exchange is launched.

The authentication key exchange processing unit 102 performs the exchange of authentication keys by exchanging 3 types of commands: "Challenge", "Response", and "Exchange Key" with the server device via the communication unit 101. When the authentication key exchange has been completed, the authentication key exchange processing unit 102 notifies the stream control unit 103a of the completion of the authentication key exchange.

When the authentication key exchange is completed, the authentication key exchange processing unit 102 sends an unauthorized device list comparison request to the unauthorized device list update unit 105. The unauthorized device list comparison request includes the Generation and the Version Number of the unauthorized device list which are included in the "Challenge" and "Response" commands described above, and an identifier of the authentication key exchange. Following this, the authentication key exchange processing unit 102 obtains the comparison result from the unauthorized device list update unit 105, and determines whether update of the unauthorized device list is necessary or not.

The comparison result that the authentication key exchange processing unit 102 receives from the unauthorized device list update unit 105 is either: "transmission/reception unnecessary (equivalent)", "transmit unauthorized device list (new)", or "receive unauthorized device list (old)".

If the comparison result received is "transmission/reception unnecessary", the updating of the unauthorized device list is not carried out.

If the comparison result is "transmit unauthorized device list", the authentication key exchange processing unit 102 obtains the unauthorized device list stored in the unauthorized device list storage unit 104 from the unauthorized device list update unit 105 and transmits the unauthorized device list via the communication unit 101.

If the comparison result is "receive unauthorized device list", the authentication key exchange processing unit 102 receives the "Exchange" command including the unauthorized device list via the communication unit 101. Upon receiving the "Exchange" command, the authentication key exchange processing unit 102 sends, to the unauthorized device list update unit 105, the unauthorized device list update request which includes the received unauthorized device list and the authentication key exchange ID.

Further, the authentication key exchange processing unit 102 sends a discard request to the state management unit 107 and releases the hardware resources upon receiving a request for the termination of the authentication key exchange.

(3) Stream Control Unit 103a

Upon receiving a notification of authentication key exchange completion including exchange key information from the authentication key exchange processing unit 102, the stream control unit 103a sends a request for the obtaining of content and metadata corresponding to the content to the communication unit 101. Following this, the stream control unit 103a receives the content and the metadata corresponding thereto. The stream control unit 103a, before launching the playback of the content, sends a use request for the use of the hardware resources of the cryptographic engine unit 106 to the state management unit 107. The stream control unit 103a uses a later-described AES-128-CBC unit 113 for decryption of encrypted data packets. The AES-128-CBC unit 113 is a hardware resource provided to the cryptographic engine unit 106.

In addition, the stream control unit 103a registers the received metadata to the state management unit 107.

The stream control unit 103a, upon receiving a use permission including a hardware resources ID from the state management unit 107, launches playback of the content.

The stream control unit 103a obtains key information from the header of the content received from the communication unit 101. Further, the stream control unit 103a generates a decryption key (content key) for decrypting the content using the key information and the exchange key received from the authentication key exchange processing unit 102.

The stream control unit 103a sequentially decrypts the content being sent from the server device using the decryption key, and passes the decrypted content to the playback device 200. While playing back the content, the stream control unit 103a transmits, at constant intervals, position information which includes a hardware resources ID and a content playback position to the state management unit 107. Thus the stream control unit 103a notifies the state management unit of the playback status of the content.

Upon termination of the playback of the content, the stream control unit 103a sends a discard request to the state management unit 107 and releases the hardware resources.

(4) Unauthorized Device List Storage Unit 104

The unauthorized device list storage unit 104 includes a memory management unit and a non-volatile memory. The unauthorized device list is stored onto the non-volatile memory. The unauthorized device list storage unit 104, upon receiving a request from the unauthorized device list update unit 105, reads the unauthorized device list from the non-volatile memory via the memory management unit. In addition, the unauthorized device list storage unit 104, upon receiving a new unauthorized device list from the unauthorized device list update unit 105, stores the data to a specified address of the non-volatile memory via the memory management unit.

Here, description will be made on the unauthorized device list referring to FIG. 3.

Figure 3:
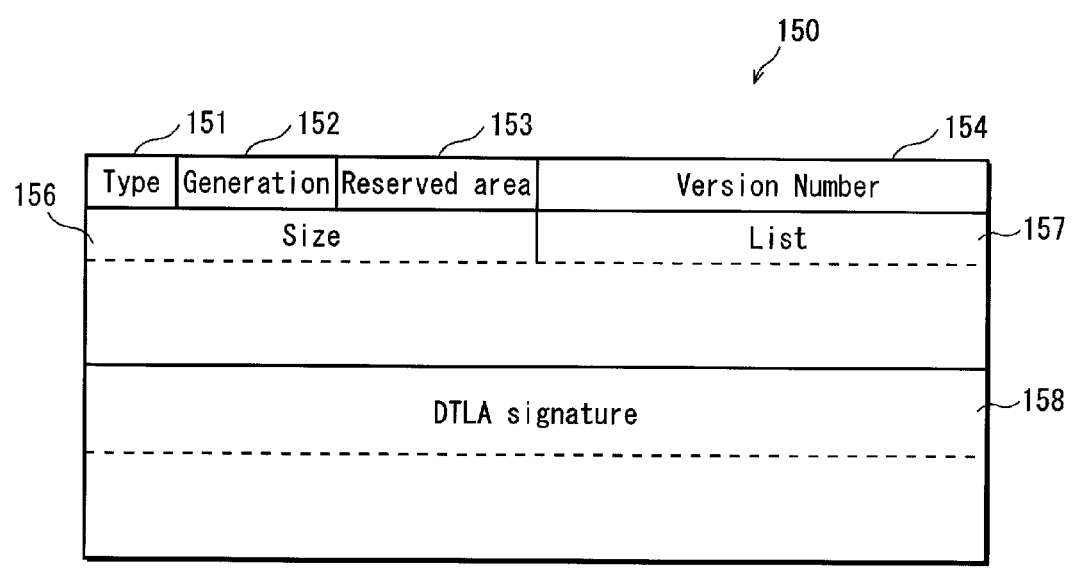
FIG. 3 is a diagram showing a format of an unauthorized device list.

The unauthorized device list 150, as depicted in FIG. 3, includes as a header such information as: Type 151 (4 bits), Generation 152 (4 bits), Reserved Area 153 (8 bits), Version Number 154 (16 bits), and (Variable) Size 156 (16 bits). The body of the unauthorized device list 150 is consisted of a List 157 with description of IDs of unauthorized devices, and a DTLA signature 158 (320 bits).

The conversion of formats of the unauthorized device list, based on the DTCP protocol, is managed according to the information provided in the Generation 152. A Generation having a larger number indicates that the unauthorized device list is of a newer format. For instance, a first-generation unauthorized device list has a number "0" written in the Generation 152, while a second-generation unauthorized device list has a number "1" written in the Generation 152. In addition to the above, the Generation 152 corresponds to the size of a non-volatile memory as well. More specifically, the size of the non-volatile memory provided to the digital device holding the unauthorized device list can be determined by referring to the information written in the Generation 152.

The Version Number 154 is incremented every time the DTLA issues a new unauthorized device list. Note that the Version Number 154 is treated as being subordinate compared to the Generation 152.

The List 157 is the main content of the unauthorized device list 150, and contains the IDs of devices that have been judged by the DTLA as being unauthorized. In performing the authentication key exchange, each server device and client device checks whether or not the ID of the device requesting for the authentication key exchange is contained in the List 157.

The DTLA signature 158 proves that the unauthorized device list 150 has been officially issued by the DTLA.

(5) Unauthorized Device List Update Unit 105

The unauthorized device list update unit 105 is launched by the authentication key exchange processing unit 102. The unauthorized device list update unit 105 utilizes an elliptic curve arithmetic unit 114 to perform verification of the DTLA signature included in the unauthorized device list. The elliptic curve arithmetic unit 114 is a hardware resource provided to the later-described cryptographic engine unit 106.

Figure 6:
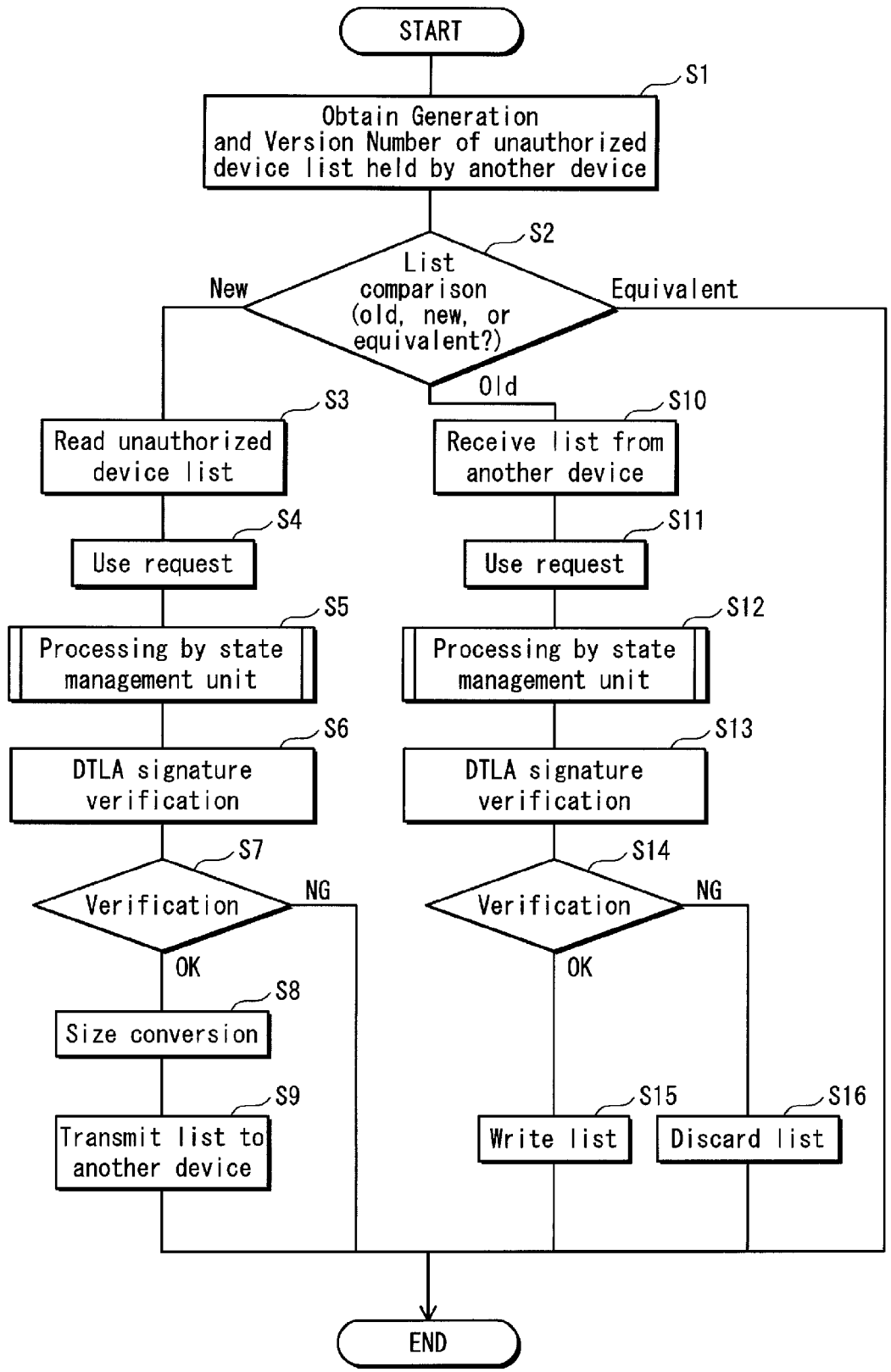
FIG. 6 is a flowchart showing the operations of an unauthorized device list update unit 105.
Figure 7:
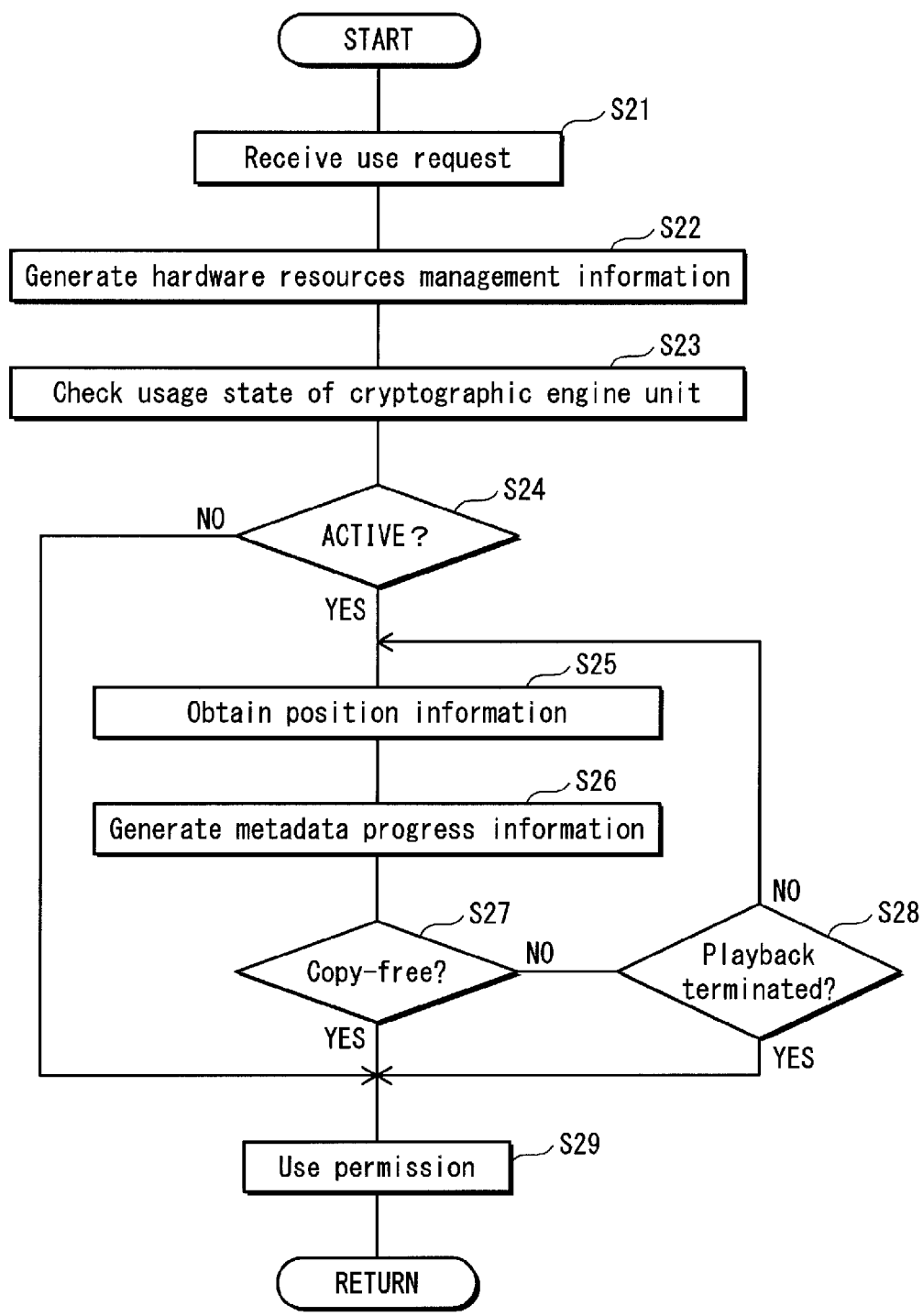
FIG. 7 is a flowchart showing the operations of a state management unit 107.

Here, description will be made on the procedures carried out by the unauthorized device list update unit 105, referring to the flowchart shown in FIG. 6.

The unauthorized device list update unit 105 obtains, from the authentication key exchange processing unit 102, an unauthorized device list comparison request. The unauthorized device list comparison request includes the Generation and Version Number of the unauthorized device list held by the server device, and the authentication key exchange ID (step S1).

When receiving the unauthorized device list comparison request, the unauthorized device list update unit 105 obtains the Generation and Version Number of the unauthorized device list of the local device from the unauthorized device list storage unit 104. Then, the unauthorized device list update unit 105 performs a comparison to determine whether the unauthorized device list of the local device is either old, new, or equivalent compared with the unauthorized device list held by the server device. The information used in carrying out the comparison is the Generation and the Version Number of the two unauthorized device lists being compared (step S2). The unauthorized device list update unit 105 then sends the result of the comparison to the authentication key exchange processing unit 102. In the present embodiment, the unauthorized device list of the local device is to be updated in cases where either the Generation or the Version Number thereof is older than the Generation or the Version Number of the unauthorized device list held by the server device.

The unauthorized device list update unit 105 discards the information received from the authentication key exchange processing unit 102 when the two unauthorized device lists are judged to be equivalent ("equivalent" in step S2).

If the unauthorized device list of the local device is newer ("new" in step S2), the unauthorized device list update unit 105 reads the unauthorized device list from the unauthorized device list storage unit 104 (step S3). Then the unauthorized device list update unit 105 sends a use request for the use of the hardware resources to the state management unit 107 (step S4), causing the state management unit to perform processing (step S5). When receiving a use permission including a hardware resources ID from the state management unit 107, the unauthorized device list update unit 105 notifies the cryptographic engine unit 106 of the unauthorized device list and the hardware resources ID. At this point, the unauthorized device list update unit 105 executes signature verification of the DTLA signature (step S6).

When the signature verification performed by the cryptographic engine unit 106 is successfully completed (OK in step S7), the unauthorized device list update unit performs conversion of the unauthorized device list according to the Generation and the Version Number of the unauthorized device list held by the server device.

Further, the unauthorized device list update unit performs a size conversion (step S8). In detail, the converted unauthorized device list obtained as a result of the previous step is further converted, so that the size of the unauthorized device is within the size of the non-volatile memory provided to the server device. Following this, the unauthorized device list update unit 105 notifies the authentication key exchange processing unit 102 of the unauthorized device list, and transmits the unauthorized device list via the authentication key exchange processing unit 102 (step S9).

When the signature verification performed by the cryptographic engine unit 106 results in a failure (NG in step S7), the unauthorized device list update unit 105 terminates the unauthorized device list update.

If the unauthorized device list of the local device is older ("old" in step S2), the unauthorized device list update unit 105 receives the unauthorized device list held by the server device via the authentication key exchange processing unit 102 (step S10).

Then the unauthorized device list update unit 105 sends a use request for the use of the hardware resources to the state management unit 107 (step S11), causing the state management unit to perform processing (step S12). When receiving a use permission including a hardware resources ID from the state management unit 107, the unauthorized device list update unit 105 notifies the cryptographic engine unit 106 of the unauthorized device list and the hardware resources ID. At this point, the unauthorized device list update unit 105 executes signature verification of the DTLA signature (step S13).

When the signature verification performed by the cryptographic engine unit 106 is successfully completed (OK in step S14), the unauthorized device list update unit 105 writes the verified unauthorized device list to the unauthorized device list storage unit 104 (step S15).

When the signature verification performed by the cryptographic engine unit 106 results in a failure (NG in step S14), the unauthorized device list update unit 105 discards the unauthorized device list received from the server device (step S16), and terminates the unauthorized device list update.

When the unauthorized device list update is completed, the unauthorized device list update unit 105 sends a discard request to the state management unit 107, and releases the hardware resources.

Note that details of the processing performed by the state management unit 107 in steps S5 and S12 are to be described later in the description of the state management unit 107.

(6) Cryptographic Engine Unit 106

Figure 4:
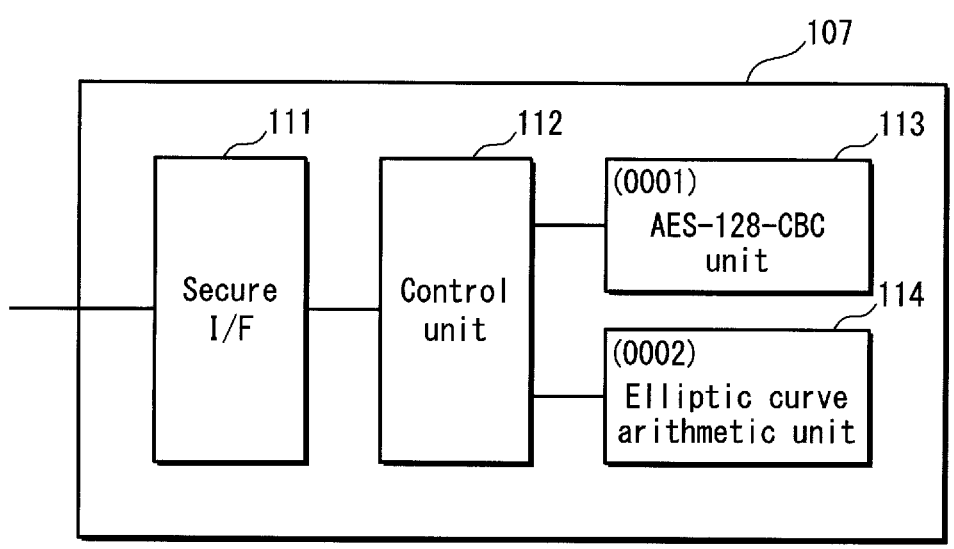
FIG. 4 is a diagram showing the structure of a cryptographic engine unit 107.

The cryptographic engine unit 106 is a secure unit composed of a tamper-resistant chip. The cryptographic engine unit 106, as depicted in FIG. 4, includes a secure interface 111, a control unit 112, the AES-128-CBC unit 113, and the elliptic curve arithmetic unit 114.

The AES-128-CBC unit 113 is a hardware resource assigned an ID 0001 and performs encryption and decryption using an AES-128-CBC algorithm. More specifically, the AES-128-CBC unit 113 decrypts encrypted data packets.

The elliptic curve arithmetic unit 114 is a hardware resource assigned an ID 0002 and performs signature generation and signature verification using an EC-DSA algorithm. More specifically, the elliptic curve arithmetic unit 114 carries out verification of the DTLA signature included in the unauthorized device list.

The control unit 112, when receiving a use request for the use of hardware resources from the state management unit 107 via the secure interface 111, outputs IDs corresponding to the hardware resources. In addition, the control unit 112, when receiving a discard request of the hardware resources from the state management unit 107, releases the corresponding hardware resources. Furthermore, the control unit 112 notifies the state management unit 107 of the processing statuses of the hardware resources.

The cryptographic engine unit 106 includes secret information used for decryption and signature verification, and therefore requires for a strong level of security to be ensured. Thus, exchange of data by the cryptographic engine unit 106 is made possible only via the secure interface 111. In addition, Time-division multiplexing is applied for the exchange of data in the communication channel connecting the secure interface 111 with external devices. Therefore, if verification of the DTLA signature by the unauthorized device list update unit 105 is executed while the stream control unit 103a is performing decryption of a data stream, decryption of the data stream will be delayed, further resulting in delayed transmission of AV data to the playback device 200.

As a means to prevent this delay, the state management unit 107 described in detail below sends a use permission for the use of the elliptic curve arithmetic unit 114 to the unauthorized device list update unit 105, seeking for and taking advantage of a timing in which decryption of the data stream is not delayed. More specifically, the state management unit 107 judges whether the elliptic curve arithmetic unit 114 is available for use by the unauthorized device list update unit 105.

(7) State Management Unit 107

The state management unit 107 manages the usage state of the hardware resources of the cryptographic engine unit 106 by the authentication key exchange processing unit 102, the stream control unit 103a, and the unauthorized device list update unit 105.

In detail, the state management unit 107, when receiving a use request for the use of the hardware resources of the cryptographic engine unit 106 from the authentication key exchange processing unit 102, the stream control unit 103a, or the unauthorized device list update unit 105, generates hardware resources management information.

Figure 5:
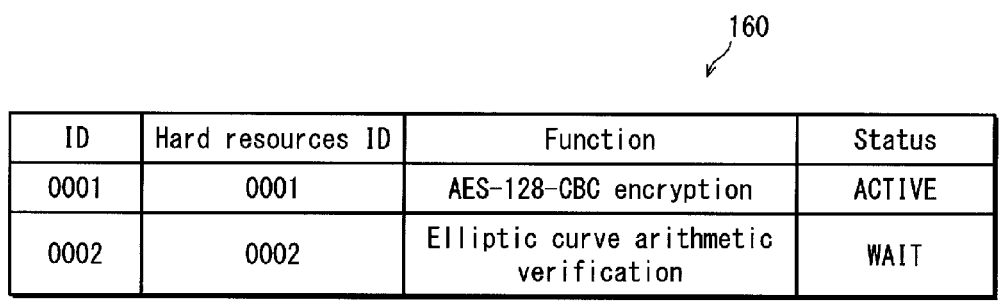
FIG. 5 is a diagram showing an example of hardware resources management information.

FIG. 5 shows an example of the hardware resources management information. The first line in the diagram indicates the hardware resources management information 160 generated when the state management unit 107 receives a use request from the stream control unit 103a. The second line indicates the hardware resources management information generated when the state management unit 107 receives a use request from the unauthorized device list update unit 105. Each piece of information includes an "ID", a "hardware resources ID", a "function", and a "status".

The "ID" is self-generated by the state management unit 107 when the state management unit 107 receives a use request from the authentication key exchange processing unit 102, the stream control unit 103a, or the unauthorized device list update unit 105.

The "hardware resources ID" is an ID of the hardware resources of the cryptographic engine unit 106 obtained as a result of the use request.

The "function" indicates the function for which the hardware resources are occupied. The types of functions here include such functions as AES-128-CBC encryption, AES-128-CBC decryption, elliptic curve arithmetic verification, and elliptic curve arithmetic signature.

The "status" indicates the usage state of the hardware resources in use. The status types to be indicated here are "ACTIVE", "WAIT", and "TERMINATE".

Upon receiving processing status information including the hardware resources ID from the cryptographic engine unit 106, the state management unit 107 updates the "status" column of the corresponding hardware resources management information.

Upon receiving a discard request from the authentication key exchange unit 102, the state management unit 107, the stream control unit 103a, or the unauthorized device list update unit 105, releases the hardware resources which had been occupied, and deletes the corresponding hardware resources management information.

Upon completing the release of the hardware resources, the state management unit 107, notifies the corresponding unit of the completion of the discard of the hardware resources. As mentioned above, the unit capable of issuing the discard request is either the authentication key exchange unit 102, the stream control unit 103a, or the unauthorized device list update unit 105.

Upon receiving a use request from the authentication key exchange unit 102, the stream control unit 103a, or the unauthorized device list update unit 105, the state management unit 107 determines whether a use permission of the hardware resources requested for is to be issued, referring to the hardware resources management information. If the requested hardware resources are available for use, the state management unit 107 sends a use permission to the unit by which the use request has been made.

The state management unit 107 receives and stores therein metadata sent from the stream control unit 103*a*. In addition, the state management unit 107 also receives position information including the playback position of the content from the stream control unit 103*a*. Combining the internally stored metadata and the received position information, the state management unit generates metadata progress information. The metadata progress information includes copy control information of the data packet to be processed subsequently by the stream control unit 103*a*.

When receiving a use request for the use of the hardware resources from the unauthorized device list update unit 105, the state management unit 107 uses a combination of the hardware resources management information and the metadata progress information to determine the timing for notifying the unauthorized device list update unit of the use permission of the hardware resources.

Now, description will be made on the operations of the state management unit 107 in a case where the state management unit 107 receives a use request for the use of the hardware resources of the cryptographic engine unit 106 from the unauthorized device list update unit 105, while the stream control unit 103*a* is in the execution of stream processing of content, with reference to the flowchart in FIG. 6. Note that the operations described hereinafter are details of the steps S5 and S12 depicted in FIG. 6.

Upon receiving a use request (step S21), the state management unit 107 generates hardware resources management information corresponding to the unauthorized device list update unit 105 (step S22). Following this, the state management unit 107 checks the usage state of the hardware resources of the cryptographic engine unit 106 (step S23).

Since it is supposed here that the playback of content by the stream control unit 103*a* has already been commenced at this point, the state management unit 107 is already in the management of the hardware resources management information corresponding to the stream control unit 103*a*. Thus, in step S23, the state management unit 107 checks whether the "status" column of the hardware resources management information corresponding to the stream control unit 103*a* is "ACTIVE" or not.

If the "status" indicated is not "ACTIVE" (NO in step S24), the state management unit 107 progresses to step S29.

If the "status" indicated is "ACTIVE" (YES in S24), the state management unit 107 obtains the position information transmitted from the stream control unit 103*a*, and by combining the position information with the metadata, generates the metadata progress information (step S26).

The state management unit 107 then judges whether the playback position section status provided in the metadata progress information generated in step S26 is "Copy-free" or not (step S27).

If the playback position section status is "Copy-free" (YES in step S27), the state management unit 107 progresses to step S29. If the playback position section status is not "Copy-free" (NO in step S27), the state management unit 107 determines whether playback of content is terminated or not. More specifically, the state management unit 107 judges whether or not the playback position section status provided in the metadata progress information generated in step S26 is "0" (step S28).

If the playback of content is terminated (YES in step S28), the state management unit 107 progresses to step S29. If the playback of content is not terminated (NO is step S28), the state management unit 107 returns to step S25 and performs the same procedures once again.

If the hardware resources usage status of the stream control unit 103*a* is not "ACTIVE", the stream control unit 103*a* is not occupying the hardware resources of the cryptographic engine unit 106. Additionally, if the playback position section status provided in the metadata progress information is "Copy-free", decryption of data packets is unnecessary. Therefore, the stream control unit 103*a* does not occupy the hardware resources of the cryptographic engine unit 106. Further in addition, if the playback of content is terminated, the stream control unit 103*a*, similarly, does not occupy the hardware resources of the cryptographic engine unit 106.

In such cases, the state management unit 107 issues a use permission of the hardware resources to the unauthorized device list update unit 105.

<Hardware Resources Management by the State Management Unit 107>

In the following, description will be made on hardware resources management performed by the state management unit 107, with reference to accompanying FIGS. 8-10.

Figure 8:
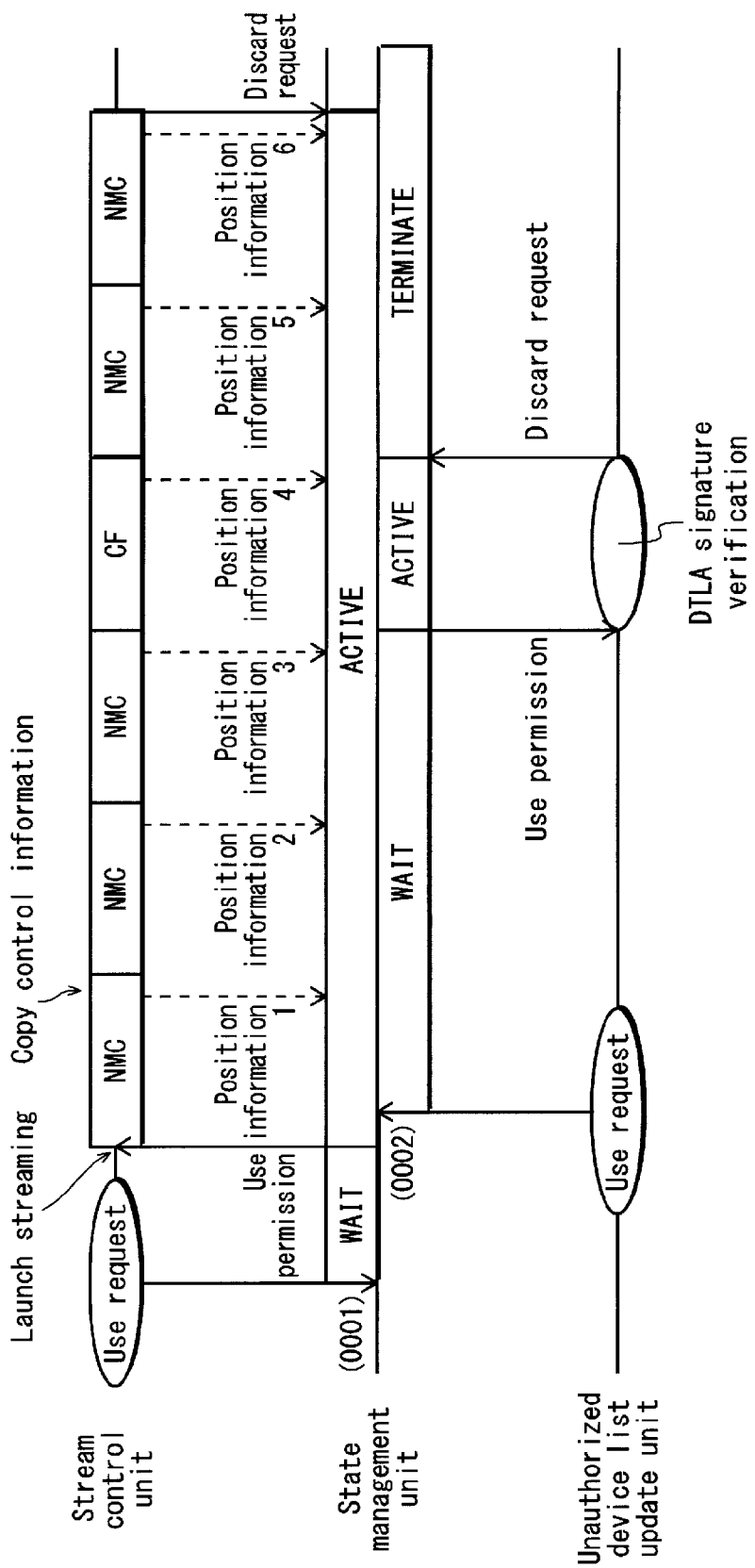
FIG. 8 shows the transitions of state of a stream control unit 103, the unauthorized device list update unit 105, and the state management unit 107.

FIG. 8 shows transitions of the states of the stream control unit 103*a*, the state management unit 107, and the unauthorized device list update unit 105.

When a use request for the use of the hardware resources is sent from the stream control unit 103*a* to the state management unit 107, the state management unit 107 generates hardware resources management information (here, the hardware resources management information is given an ID 0001). Then, when a use permission of the hardware resources is sent back in response to the stream control unit 103*a* from the state management unit 107, the stream control unit 103*a* launches stream processing.

Note that here, description will be made on a presumption that the pieces of copy control information of the data packets to be played back are NMC, NMC, NMC, CF, NMC, NMC, arranged in this order from the beginning of the content. In this sequence, "NMC" stands for "No-more-copies", while "CF" stands for "Copy-free".

After playback is launched, the stream control unit 103*a* sends position information pieces 1-6 to the state management unit 107 at a constant time interval. The position information pieces each include a playback position.

Every time the state management unit 107 receives position information, the state management unit 107 generates metadata progress information combining the position information with metadata stored therein.

Figure 9:
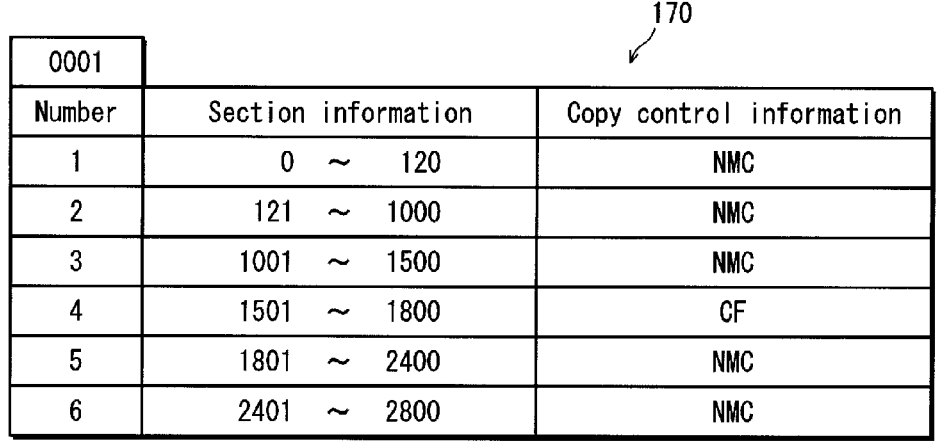
FIG. 9 is a diagram showing an example of metadata.
Figure 10A:
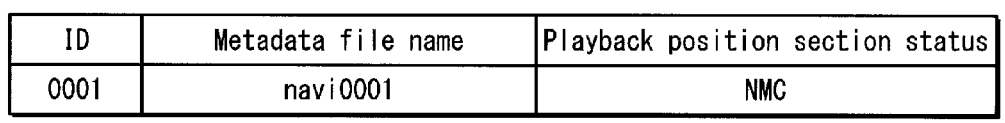
FIGS. 10A, 10B, and 10C are diagrams showing examples of metadata progress information.

In detail, if supposing that metadata 170 depicted in FIG. 9 is held by the state management unit 107, the state management unit 107, when receiving either position information 1, position information 2, or position information 5, generates metadata progress information 180 depicted in FIG. 10A. In the metadata progress information 180, "NMC" is written as the playback position section status. This indicates that the copy control information of the data packet to be played back subsequently is set to "NMC".

Figure 10B:
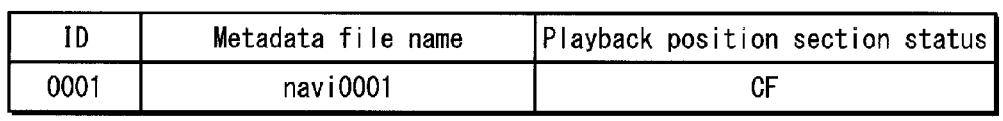

Further, when receiving position information 3, the state management unit 107 generates metadata progress information 190 depicted in FIG. 10B. In the metadata progress information 190, "CF" is written as the playback position section status. This indicates that the copy control information of the data packet to be played back subsequently is set to "CF".

Figure 10C:
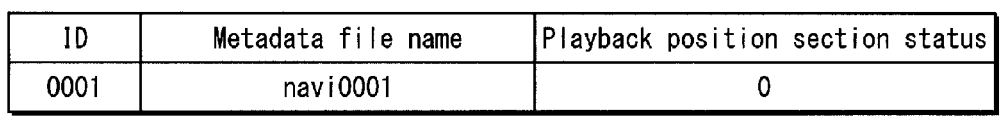

Further in addition, when receiving position information 6, the state management unit 107 generates metadata progress information 210 depicted in FIG. 10C. In the metadata progress information 210, "0" is written as the playback position section status. This indicates that a data packet to be played back subsequently does not exist, meaning that playback of the content will be terminated.

Note that since the position information pieces 1-6 each include a playback position, the state management unit 107 can refer to the playback positions and the section information provided in the metadata 170 to determine which data packet among the sequence of data packets is currently being processed by the stream control unit 103a. In addition, the state management unit 107 obtains the copy control information of the data packet to be processed subsequently from the metadata 170, and sets the value to the playback position section status of the metadata progress information.

For instance, if the playback position provided in the position information 3 is 1420, the state management unit 107 determines that the stream control unit 103a is currently processing the $3^{rd}$ data packet in the sequence. Since the copy control information of the $4^{th}$ data packet which will be played back subsequently is "CF", the state management unit 107 sets the value "CF" to the playback position section status of the metadata progress information.

Furthermore, if the playback position provided in the position information 6 is 2700, the state management unit 107 determines that the stream control unit 103a is currently processing the $6^{th}$ packet data in the sequence. Further, since a data packet to be played back subsequently does not exist, the state management unit 107 sets the value "0" to the playback position section status of the metadata progress information.

Returning to the description of FIG. 8, when a use request for the use of the hardware resources is sent from the unauthorized device list update unit to the state management unit 107, the state management unit 107 generates hardware resources management information (here, the hardware resources management information is given an ID 0002). Following this, the state management unit 107 waits for a point where the playback position section status changes to "CF", while generating metadata progress information. In this example, the playback position section status of the metadata progress information changes to "CF" after the state management unit receives the position information 3. Then the state management unit 107 sends a use permission for the use of the hardware resources to the unauthorized device list update unit 105.

The unauthorized device list update unit 105, when receiving the use permission, performs the verification of the DTLA signature.

The unauthorized device list update unit 105 sends a discard request of the hardware resources to the state management unit 107 upon the completion of the DTLA signature verification. Similarly, the stream control unit 103a sends a discard request of the hardware resources to the state management unit 107 upon the completion of the playback.

<Structure of the Server Device 20>

Figure 11:
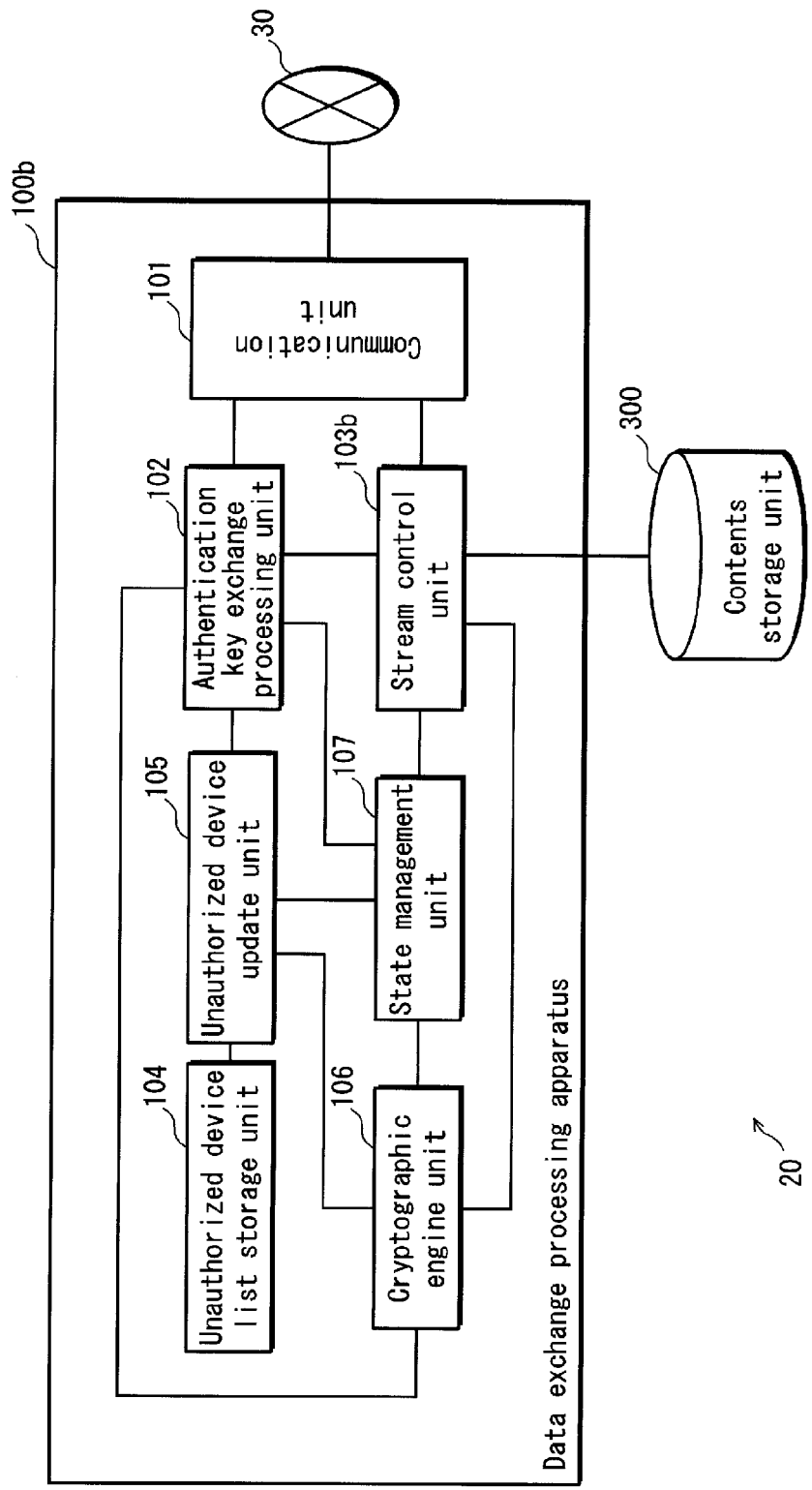
FIG. 11 is a block diagram showing the functional structure of a server device 20.

FIG. 11 is a block diagram showing the structure of the server device 20.

As shown in FIG. 11, the server device 20 includes a data exchange processing apparatus 100b pertaining to the present invention and a contents storage unit 300.

The data exchange processing apparatus 100b includes, the communication unit 101, the authentication key exchange processing unit 102, a stream control unit 103b, the unauthorized device list storage unit 104, the unauthorized device list update unit 105, the cryptographic engine unit 106, and the state management unit 107.

The contents storage unit 300 is composed of a hard disc and so on, and includes one or more contents and metadata pieces in one-to-one correspondence with each of the contents. Here, the word "content" is intended to represent such content as movies, music, computer programs, computer games, photographs, text data and the like.

In FIG. 11 depicting the server device 20, the same symbols as FIG. 2 are applied for components of the data exchange processing apparatus 100b which have the same functions as those of the components of the data exchange processing apparatus 100a of the client device 10 depicted in FIG. 2. Here, description will not be made regarding components which have the same symbols applied as in FIG. 2, and therefore, description will be solely made on the stream control unit 103b.

The stream control unit 103b, when being requested for metadata by the client device via the communication unit 101, obtains metadata corresponding to a content from the contents storage unit 300. Then the stream control unit 103b transmits the metadata to the client device via the communication unit 101.

Further, the stream control unit 103b, when requested for content by the client device via the communication unit 101, obtains an exchange key from the authentication key exchange processing unit 102. Then the stream control unit 103b sends a use request for the use of the hardware resources of the cryptographic engine unit 106 to the state management unit 107.

Following this, the stream control unit 103b receives a use permission of the hardware resources from the state management unit 107 and reads the content from the contents storage unit 300. The use permission received includes a hardware resources ID.

The stream control unit 103b obtains key information from the header of the content. And by combining the key information and the exchange key received from the authentication key exchange processing unit, generates an encryption key (content key) for encrypting the content. Then the stream control unit 103b divides the content into data packets, encrypts the data packets, and transmits the encrypted data packets sequentially via the communication unit 101.

Here, for data packets whose copy control information is set to CF, the stream control unit 103b does not need to perform encryption, and such data packets are sent to the client device 10 in plain text. For data packets whose copy control information is set to NMC, the stream control unit 103b transmits data packets to client device 10 after performing encryption thereof.

Further, upon completion of encryption and transmission of content, the stream control unit 103b sends a discard request of the hardware resources to the state management unit 107.

The client device 10 receives and plays back data packets, while the server device 20 encrypts and transmits data packets. Therefore, the state management unit 107 of the server device generates metadata progress information, combining the metadata and the processing position while the stream control unit 103b is executing stream processing using the cryptographic engine unit 106. Similarly, the state management unit 107 refers to the metadata progress information to send a use permission for the use of the hardware resources to the unauthorized device list update unit 105 when the stream control unit 103b is in the processing of data packets whose copy control information is set to CF ("Copy-free").

<Sequence Diagram of the System>

Figure 12:
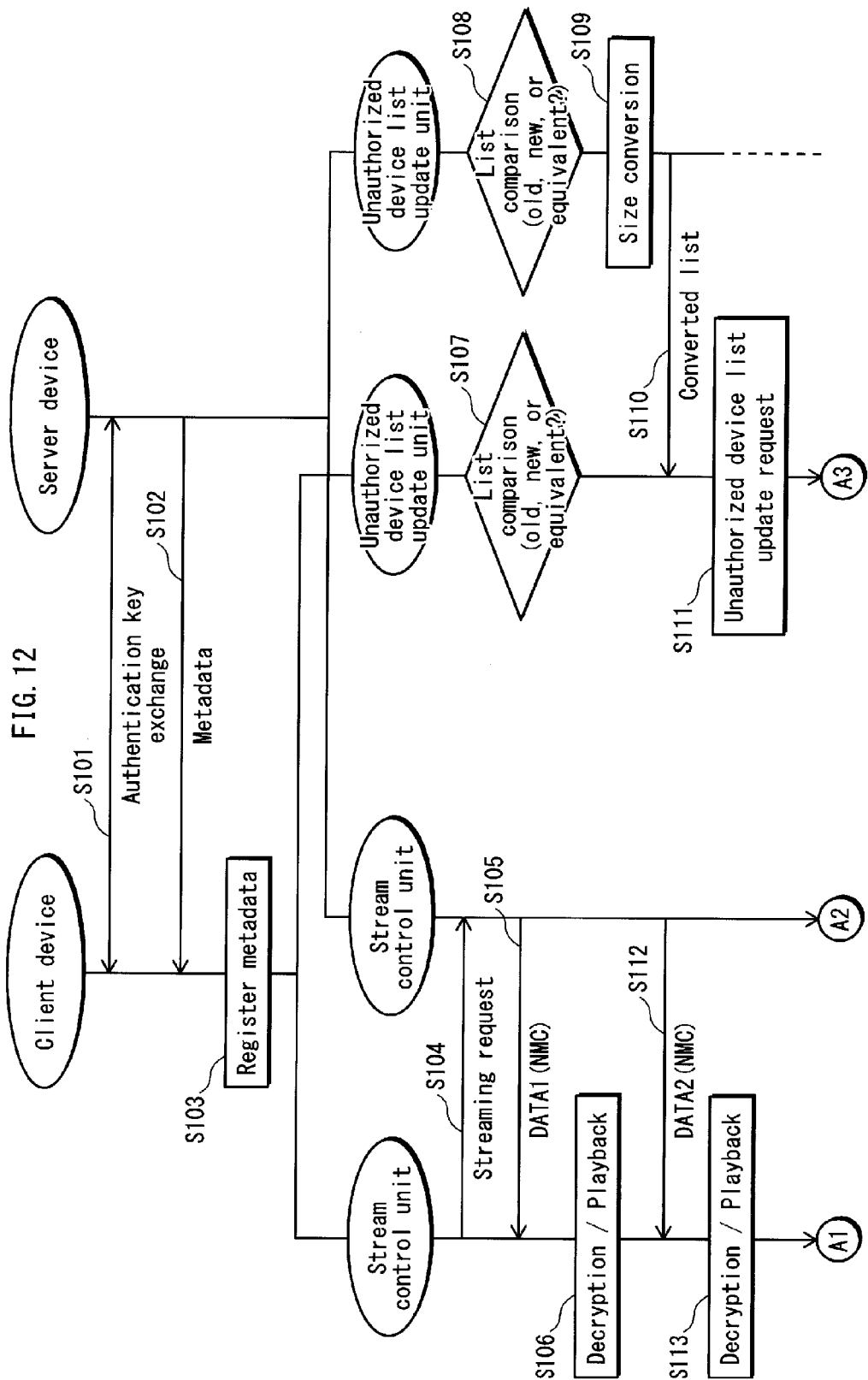
FIG. 12 is a sequence diagram showing stream processing and unauthorized device list update performed by the client device 10 and the server device 20, with examples provided and continuing to FIG. 13.

FIGS. 12 and 13 are sequence diagrams showing the procedures of the unauthorized device list update performed in the client device 10 and the server device 20.

Here, description will be made on an example of an operation where the client device 10 updates an unauthorized device list while obtaining content from the server device 20 and performing playback thereof.

First, the user operates the operation unit (not depicted) of the client device 10, requesting for the playback of content. The client device 10, in response, executes an application having a contents playback function.

The client device 10 makes a request for authentication key exchange to the server device 20 holding the target content via the network 30. The server device 20, when receiving the request for authentication key exchange, executes authentication key exchange between the authentication key exchange processing unit 102 of the client device 10 and the authentication key exchange processing unit 102 of the server device 20 (step S101). Note here that the client device 10 obtains an exchange key during the authentication key exchange and sends the exchange key to the stream control unit 103a. In addition, the client device 10 and the server device 20 mutually exchange the Generation and Version Number of the unauthorized device list held by each device during the authentication key exchange.

The client device 10 sends a request for metadata to the server device 20 via the network 30. The server device 20, upon receiving the request for metadata, transmits the metadata to the client device 10 (step S102). The client device 10, upon obtaining the metadata, registers the metadata to the state management unit 107 (step S103).

The stream control unit 103a of the client device 10 transmits a stream processing request to the server device 20 via the network 30, and the stream control unit 103b of the server device 20 receives the stream processing request (step S104).

The stream control unit 103b transmits a data packet (DATA 1) of the content corresponding to the stream processing request to the stream control unit 103a. The stream control unit 103a receives DATA 1 (step S105). The DATA 1 transmitted/received in step S105 has the copy control information set to "NMC", and therefore is encrypted. Thus, the stream control unit 103a plays back AV data while decrypting the received DATA 1 (step S106).

On the other hand, the unauthorized device list update unit 105 of the client device 10 and the unauthorized device list update unit 105 of the server device 20 mutually determine whether the unauthorized device list held by the local device is either old, new, or equivalent compared with the unauthorized device list held by the target device (steps S107 and S108). Here, description will be made under the presumption that the unauthorized device list held by the server device 20 is newer compared with the unauthorized device list held by the client device 10. Note that the procedures in steps S107/S108 are performed in parallel with the stream processing request (step S104), and the order in which steps S107/S108 and step S104 are executed may change.

The server device 20, when determined to be the sender of the unauthorized device list in step S108, reads the unauthorized device list from the unauthorized device list storage unit 104 and converts the size of the unauthorized device list, based on the Generation of the unauthorized device list held by the client device 10 (step S109). Note that the Generation of the unauthorized device list of the client device 10 has been obtained prior to this step, specifically in step S101. Following this, the server device 20 transmits the converted unauthorized device list to the client device 10 via the authentication key exchange processing unit 102, and the client device 10 receives the converted unauthorized device list (step S110).

The authentication key exchange processing unit 102, upon receiving the unauthorized device list, sends an unauthorized device list update request to the unauthorized device list update unit 105 (step S111). In response, the unauthorized device list update unit 105 sends a use request for the use of the hardware resources to the state management unit 107.

Note that the client device 10 executes the two procedures, the unauthorized device list update and stream processing of content in parallel.

Stream processing is continuously carried out up to this point from step S106. The server device 20 transmits a data packet (DATA 2) succeeding DATA 1 to the client device 10, and the client device receives DATA 2 (step S112). Since DATA 2 is encrypted, the stream control unit 103a plays back AV data while decrypting the received DATA 2 (step S113).

Following the above step, the server device 20 transmits a data packet (DATA 3) succeeding DATA 2 to the client device 10, and the client device 10 receives DATA 3 (step S114). Since DATA 3 is encrypted, the stream control unit 103a plays back AV data while decrypting the received DATA 3 (step S115).

Every time the state management unit 107 of the client device 10 receives position information from the stream control unit 103a, the state management unit 107 generates metadata progress information combining the position information with the metadata registered in step S103.

At this point, it is judged that the data packet (DATA 4) to be obtained next has the copy control information set to "CF" (Copy-free), and therefore that DATA 4 is a data packet which does not require decryption. Hence, the state management unit 107 judges that the verification of the DTLA signature included in the unauthorized device list can be performed in a shorter amount of time compared with the processing of DATA 4, and sends a use permission for the use of the hardware resources to the unauthorized device list update unit 105 (step S116).

The server device 20 transmits a data packet (DATA 4) succeeding DATA 3 to the client device 10, and the client device 10 receives DATA 4 (step S117). Since DATA 4 is not encrypted, the stream control unit 103a plays back the received DATA 4 without performing decryption thereof (step S118).

While the unencrypted DATA 4 is being played back, the unauthorized device list update unit 105 executes the unauthorized device list update (step S119), writing the unauthorized device list to the unauthorized device list storage unit 104 (step S120).

Stream processing is continuously carried out up to this point from step S118. The server device 20 transmits a data packet (DATA 5) succeeding DATA 4 to the client device 10, and the client device 10 receives DATA 5 (step S121). The stream control unit 103a plays back AV data while decrypting the received DATA 5 (step S122).

The server device 20 transmits a data packet (DATA 6) succeeding DATA 5 to the client device 10, and the client device 10 receives DATA 6 (step S123). The stream control unit 103a plays back AV data while decrypting the received DATA 6 (step S124).

<Modifications>

In the above, description has been made on the present invention according to the embodiment thereof, but the present invention is not limited to the embodiment introduced herein. Below are some examples of modifications which may be conceived.

(1) In the above embodiment, the AES-128-CBC unit 113 and the elliptic curve arithmetic unit 114 were mounted onto the cryptographic engine unit 106 as the hardware resources thereof. However, the cryptographic engine unit according to the present invention is not limited to this, and hardware resources compatible to other algorithms may be applied instead.

(2) In the above embodiment, unauthorized device list update is launched after stream processing is commenced between the server device and the client device, as shown in FIG. 12.

However, the present invention is not limited to this. The present invention includes cases where unauthorized device list update is launched prior to stream processing, given that the unauthorized device list used in the update process is obtained before stream processing is commenced.

The state management unit 107 is capable of judging that the cryptographic engine unit 106 is not presently under use by the stream control units 103a and 103b, by referring to the hardware resources management information. Thus, in such cases, the state management unit 107 may send a use permission for the use of the hardware resources to the unauthorized device list update unit 105 from which a use request for the use of the hardware resources has been sent.

Note that, if stream processing is launched by the stream control units 103a and 103b while the unauthorized device list update unit 105 is occupying the cryptographic engine unit 106, the state management unit 107 may perform control so that the stream control units 103a and 103b are given priority to use the cryptographic engine unit 106.

That is, the state management unit 107, when receiving a use request for the use of the hardware resources from the stream control units 103a and 103b, checks the current usage state of the cryptographic engine unit 106 by referring to the hardware resources management information. When the unauthorized device list update unit 105 is currently occupying the cryptographic engine unit 106, the state management unit 107 sends a request for the suspension of signature verification to the unauthorized device list update unit 105.

Here, if the AES-128-CBC unit 133 and the elliptic curve arithmetic unit 114 of the cryptographic engine unit 106 are sharing a same single register (not depicted), the register is in hold of such information as intermediate values of calculations having been carried out by the elliptic curve arithmetic unit 114. Therefore, the elliptic curve arithmetic unit 114 can temporarily save the intermediate calculation values held by the register to the memory (undepicted).

The unauthorized device list update unit 105 temporarily suspends signature verification, when receiving a request for suspending signature verification. Following this, the state management unit sends a use permission for the use of the hardware resources to the stream control units 103a and 103b.

After stream processing by the stream control units 103a and 103b has been launched, control by the state management unit 107 as described in the above embodiment can be performed.

More specifically, in such control, the state management unit 107 generates metadata progress information combining metadata and position information, and causes signature verification by the unauthorized device list update unit 105 to be resumed from the point in time when the stream control units 103a and 103b perform the processing of a "Copy-free" data packet. In cases where "Copy-free" data packets do not exist, the unauthorized device list update unit 105 is controlled so that signature verification is resumed when stream processing has been terminated.

(3) In the above embodiment, metadata progress information is adopted as the information used to determine the timing in which a use permission is sent to the unauthorized device list update unit 105. Additionally, in the above modification (2), a combination of hardware resources management information and metadata progress information is used to determine the timing in which a use permission is transmitted to the unauthorized device list update unit 105.

In either case, the possibility of the AES-128-CBC unit 113 and the elliptic curve arithmetic unit 114 performing processing in parallel is excluded, but however, the present invention is not limited to this.

That is, the present invention may be configured so that the AES-128-CBC unit 113 and the elliptic curve arithmetic unit 114 perform processing in parallel. In such cases, the state management unit 107 may determine whether to issue a use permission for the use of the hardware resources according to such information as hardware resources simultaneous processing capability and hardware resources bandwidth information as well as the metadata progress information and the hardware resources management information referred to above.

For example, the state management unit 107 may be preliminarily provided with hardware resources bandwidth information, which includes description of the bandwidths necessary for each the stream processing and the DTLA signature verification. Further, the state management unit 107 may manage the bandwidth currently in use. Under such conditions, when a use request is received from the unauthorized device list update unit 105, the state management unit 107 may use the hardware resources bandwidth information and the information of the bandwidth currently in use to determine whether or not to give the unauthorized device list update unit 105 permission to use the elliptic curve arithmetic unit 114.

In the above example, if there is a possibility that delay of stream processing may occur as a result of the elliptic curve arithmetic unit 114 being occupied, the state management unit 107 does not give the unauthorized device list update unit 105 permission to use the elliptic curve arithmetic unit 114. In contrast, when stream processing is not delayed even if the elliptic curve arithmetic unit 114 is occupied, the state management unit 107 may give the unauthorized device list update unit 105 permission to use the elliptic curve arithmetic unit 114.

(4) In the above embodiment, description has been made on an application where unauthorized device lists are exchanged between a client device and server device, both of which are connected to the network 30, the network 30 being a home network.

The present invention is not limited to the exchange of unauthorized device lists performed between a client device and a server device, and may include such cases as below.

(a) A DTLA operation server managed by the DTLA may be installed onto a network such as the interne. The DTLA operation server may be configured to manage new unauthorized device lists distributed by the DTLA. Each digital device (the client device and server device as described in the embodiment) may receive a new unauthorized device list from the DTLA operation server via the network and thus, update the unauthorized device list.

(b) In addition, it may be conceived to distribute a new unauthorized device list by storing the new unauthorized device list onto a portable medium. For instance, the new unauthorized device list may be stored and sold on DVD-ROMs and BD-ROMs which are commercial media with movie contents stored thereon. In such cases, each device, when a medium is inserted thereto, may be configured to judge whether the unauthorized device list held by the local device is old, new, or equivalent compared with the unauthorized device list stored on the medium. If the unauthorized device list held by the local device is older, the local device may read the new unauthorized device list from the medium and update the unauthorized device list.

(5) In the above embodiment, the client device and the server device are computer systems including a microprocessor, ROM, RAM, HDD and the like. Having such a structure, the client and server devices are able to perform a variety of functions with the microprocessor executing computer programs recorded onto the HDD or the ROM utilizing an operative RAM. Here, a computer program is composed of a combination of a plurality of instruction codes, each indicating an instruction for the computer to follow to perform a specified function.

In addition, a portion or an entirety of the constituents of the client and server devices may be composed of a single system LSI (Large Scale Integration). A system LSI is an ultra-multifunctional LSI manufactured by integrating a plurality of components onto one computer chip. More specifically, a system LSI is a computer system including such components as a microprocessor, a ROM, a RAM and the like.

Further, each of the components of the client and server devices may either be individually mounted onto a single chip, or a portion or an entirety of the components may be mounted onto a single chip.

Furthermore, the present invention may be a method as described above, a computer program for realizing the method, or such computer readable recording media as a flexible magnetic disk, a hard disc, a CD-ROM, an MO, a DVD, a DVD-ROM, a DVD-RAM, a BD (Blu-ray Disc) or a semiconductor memory having the computer program recorded thereonto.

(6) The embodiment and modifications described above may each be combined.

INDUSTRIAL APPLICABILITY

The present invention can be used, in the field of manufacturing and distributing data exchange processing apparatuses based on the DTCP-IP protocol, as a structure allowing unauthorized device list updates to be executed during stream processing of contents without causing degradation of playback quality.

REFERENCE SIGNS LIST 1 network system
10, 11, 12 client device
20, 21, 22 server device
30 network
100a data exchange processing apparatus
100b data exchange processing apparatus
101 communication unit
102 authentication key exchange processing unit
103a stream control unit
103b stream control unit
104 unauthorized device list storage unit
105 unauthorized device list update unit
106 cryptographic engine unit
107 state management unit
200 playback device
300 contents storage unit

The invention claimed is:

1. A data exchange processing apparatus for exchanging a list of unauthorized devices with devices, the list of unauthorized devices being used to block unauthorized devices, the data exchange processing apparatus comprising:

a cryptographic engine unit operable to perform cryptographic processing and verification processing;
a stream control unit operable to perform stream processing for sequentially outputting a plurality of sections constituting a content while causing the cryptographic engine unit to execute the cryptographic processing on each section of the plurality of sections constituting the content;
a list update unit operable to cause the cryptographic engine unit to execute the verification processing of the list of unauthorized devices;
a metadata acquisition unit that acquires metadata indicating, for each section of the plurality of sections, a position of the section in the content and a processing load exerted on the cryptographic engine unit when executing the cryptographic processing on the section; and
a state management unit operable to obtain, at regular intervals from the stream control unit, a position in the content that is currently being processed by the stream control unit, and to output, a processing permission to the list update unit when the stream control unit commences the stream processing with respect to a section of the plurality of sections that, according to the metadata, exerts a relatively low processing load on the cryptographic engine unit, wherein
the list update unit causes the cryptographic engine unit to launch the verification processing of the list of unauthorized devices when receiving the processing permission.

2. The data exchange processing apparatus according to claim 1, wherein
the metadata includes copy control information, the copy control information indicating whether or not each of the sections constituting the content is copyright protected, and
the state management unit outputs the processing permission to the list update unit when the stream control unit commences the stream processing with respect to a section of the plurality of sections that is not copyright protected.

3. The data exchange processing apparatus according to claim 1, wherein
the metadata includes section information on each of the sections constituting the content, and
the state management unit outputs the processing permission to the list update unit when the stream control unit terminates the stream processing with respect to a section of the plurality of sections that is a final section the content.

4. The data exchange processing apparatus according to claim 1, wherein
the state management unit outputs the processing permission to the list update unit and launches the verification processing of the list of unauthorized devices, when receiving a request for use of the cryptographic engine unit from the list update unit while the cryptographic engine unit is not executing the cryptographic processing on the content, and suspends the verification processing of the list of unauthorized devices and outputs the processing permission to the stream control unit, when receiving a request for use of the cryptographic engine unit from the stream control unit.

5. The data exchange processing apparatus according to claim 1, further comprising a holding unit operable to hold the list of unauthorized devices, wherein the list update unit includes:

a judging unit judging whether or not to update the list of unauthorized devices held by the holding unit according to version information and generation information of another list of unauthorized devices obtained from another data exchange processing apparatus;

an obtaining unit obtaining the other list of unauthorized devices from the other data exchange processing apparatus, when the judging unit judges to update the list of unauthorized devices held by the holding unit;

a verification unit requesting the cryptographic engine unit to execute the verification processing of legitimacy of the other list of unauthorized devices, when receiving the processing permission from the state management unit; and an update unit replacing the list of unauthorized devices held by the holding list with the other list of unauthorized devices, when the legitimacy of the other list of unauthorized devices is verified.

6. A data exchange processing method for use on a data exchange processing apparatus for exchanging a list of unauthorized devices with devices, the data exchange processing apparatus including a cryptographic engine unit performing cryptographic processing and verification processing, and the list of unauthorized devices being used to block unauthorized devices, the data exchange processing method comprising:

a metadata acquisition step of acquiring metadata indicating, for each section of a plurality of sections constituting a content, a position of the section in the content and a processing load exerted on the cryptographic engine unit when executing the cryptographic processing on the section;

a stream control step of performing stream processing for sequentially outputting the plurality of sections constituting the content while causing the cryptographic engine unit to execute the cryptographic processing on each section of the plurality of sections constituting the content;

a state management step of obtaining, at regular intervals from the stream control step, a position in the content that is currently being processed in the stream control step, and outputting a processing permission when the stream control step commences the stream processing with respect to a section of the plurality of sections that, according to the metadata, exerts a relatively low processing load on the cryptographic engine unit; and a list update step of causing the cryptographic engine unit to launch the verification processing of the list of unauthorized devices when receiving the processing permission output from said state management step.

* * * * *